Feb. 21, 1933.   L. L. KAESS   1,898,488
RADIO DIRECTION FINDER
Filed July 2, 1929
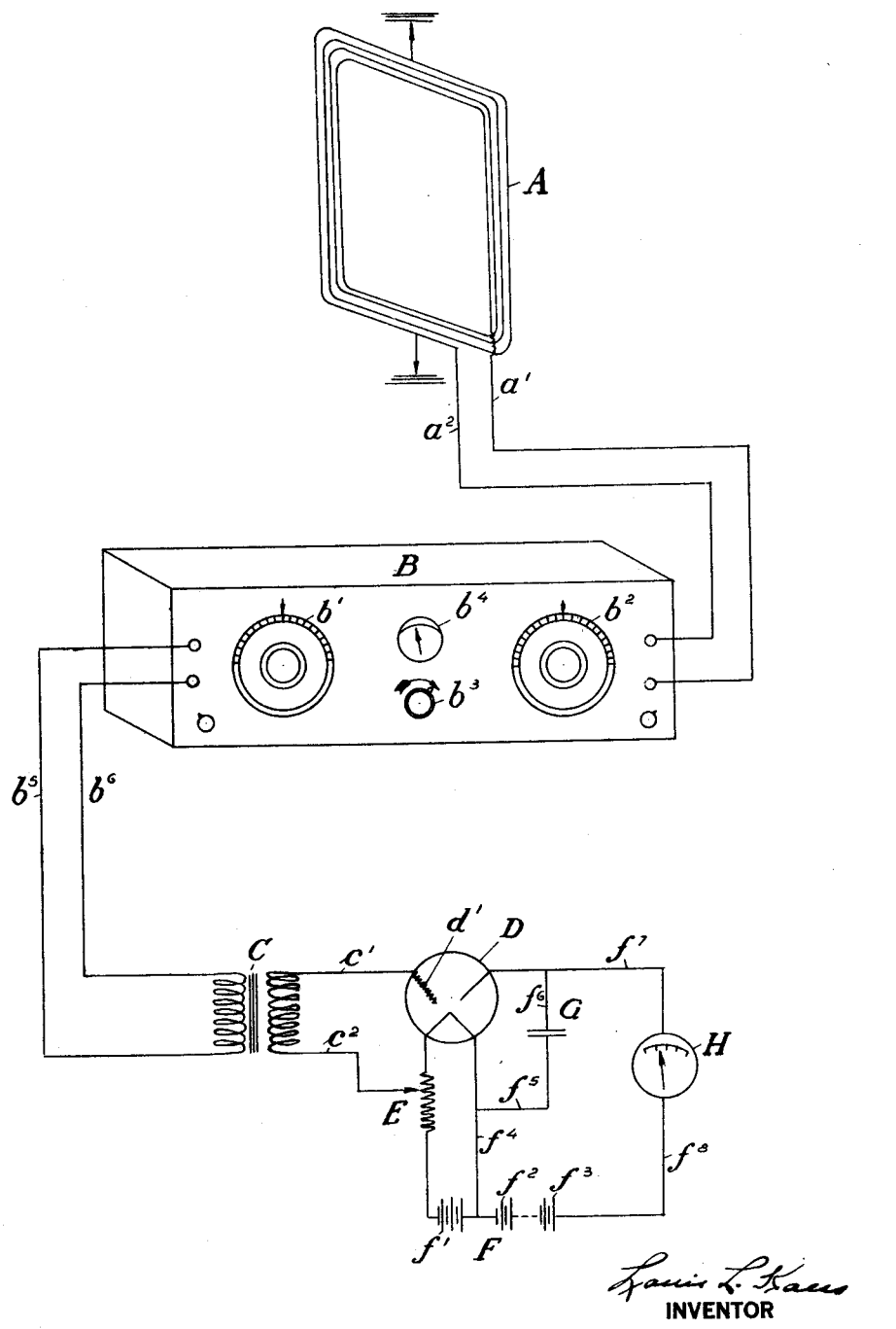

Patented Feb. 21, 1933

1,898,488

UNITED STATES PATENT OFFICE

LOUIS L. KAESS, OF NEW YORK, N. Y.

RADIO DIRECTION FINDER

Application filed July 2, 1929. Serial No. 375,478.

My invention relates to a radio direction finder in which a rotatable antenna is used and comprises means which will produce a visual indication of every signal picked up by the antenna, showing also the intensity of the signals.

The accompanying drawing illustrates my invention:

A designates a loop antenna which is rotatably supported and may be of any suitable design.

B designates a radio receiving instrument which may be of any suitable form and is here represented in a schematic way, whereby certain parts, as the dials $b'$, $b^2$ of the tuning condensers, a knob $b^3$ of the volume control and a voltmeter $b^4$, are indicated.

The antenna A is connected with the input side of the radio receiving instrument B by wires $a^1$ $a^2$.

From the output side of the radio receiving instrument extend two wires $b^5$ $b^6$ to the primary winding of a transformer C, from the secondary winding, whereof extends a wire $c^1$ to the grid $d^1$ of a vacuum tube D which is preferably a tube of high amplification factor.

From the other end of the secondary winding of the transformer C extends a wire $c^2$ to the movable arm of a potentiometer E. One end of the potentiometer E is connected to the negative side of a battery $f'$ and the other end of the potentiometer is connected to one end of the filament of the tube, the other end of the filament being connected to the positive end of the battery $f'$. The positive side of the battery $f'$ is also connected to the negative side $f^2$ of battery F, the positive side $f^3$ of said battery being connected through a wire $f^8$ to a device H and from there through a wire $f^7$ to the plate of the tube D. A condenser G is placed in shunt to the plate and the positive end of the tube filament, the condenser G being connected by a wire $f^6$ to wire $f^7$ and by a wire $f^5$ to a wire $f^4$ leading to the negative end $f^2$ of the battery F. The device H is a sensitive visual indicator, responsive to direct currents of the order of a few milliamperes.

The combination which I have described consists therefore of means for providing visual indication of maximum and minimum positions of a rotatable antenna A, to work in combination with such an antenna system A, and a suitable detecting device B, here shown as a radio receiving instrument.

The rotatable antenna A serves to pickup with varying degrees of intensity radio waves from any of the several sources, such as broadcasting stations, fog signals, transmitting stations, commercial radio stations and airplane carrier transmitting stations.

The receiving instrument B serves to convert and make known such electro-magnetic emanations into frequencies capable of observance by the ear, this results in a signal capable of being observed audibly but not visually.

The purpose of this invention is to intercept and transform them into signals that can be observed visually, thus affording the positive visual indication of the position of minimum and maximum picked up by any rotatable antenna system.

Device D consists of a three electrode vacuum tube, preferably having a higher amplifying characteristic, its function is to start and stop a flow of current through device H from device E in exact accordance with the signals derived from device C.

It can thus be seen that the current supplied by the battery F and $f'$ flowing through the plate circuit of the tube D also passes the visual indicating device H, whereas the alternating current component of the plate current will flow through the by-path condenser G and thus has no effect on device H.

Device E is a resistance serving the twofold purpose of limiting the current flow through the filament of device D from device F and also holding the grid of device D at such negative potential with respect to the filament, to permit current to flow through device H only when signal voltage is being impressed upon the grid of device D.

Device H consists of a current flow indicator affording a visual means of observing the current made to flow in the circuit incidental to it by the impressed signal voltage upon the grid of device D. Where a signal being received is of a constant amplitude, device H may be calibrated in degrees from which the oscillable antenna is oscillated to either side of its position of maximum or minimum pick-up.

It should be noted that the source of plate supply includes besides the battery F also the battery $f'$ supplying also the heating current of the filament. It should be well understood that instead of providing batteries for the supply of the plate current and heating current, other suitable electric sources may be employed.

What I claim is my invention and desire to secure by Letters Patent is:

In a radio direction finder system, a rotatable loop antenna; means for grounding the outer turn of said loop antenna to shield it from undesirable electrostatic fields; a radio frequency receiver operatively connected to said loop antenna; an electron tube including anode, cathode, and control electrodes; input and output circuits for said electron tube; means for connecting said input circuit to the output of said receiver; means for applying a saturating negative potential to the control electrode to produce completely rectified current in said output circuit; and a direct current milliameter in said output circuit, whereby an indication proportional to the current received in the loop antenna is obtained in said milliameter.

Signed at the city of New York in the county of New York and State of New York, April A. D. 1929.

LOUIS L. KAESS.